(12) United States Patent
Hayahi (10) Patent No.: US 8,196,261 B2
(45) Date of Patent: Jun. 12, 2012

(54) TILT HINGE CAPABLE OF EASILY SWITCHING A MOVABLE RANGE BY A PUSHING OPERATION

(75) Inventor: Manabu Hayahi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 402 days.

(21) Appl. No.: 12/534,385

(22) Filed: Aug. 3, 2009

(65) Prior Publication Data

US 2010/0031473 A1    Feb. 11, 2010

(30) Foreign Application Priority Data

Aug. 8, 2008  (JP) ................. 2008-205754

(51) Int. Cl.
*E05C 17/64* (2006.01)
(52) U.S. Cl. ............... 16/337; 16/324; 16/342
(58) Field of Classification Search ........... 16/297, 16/321, 324, 337, 341, 342, 374, 375; 361/679.27; 248/919–923; 403/103, 120; 384/794
See application file for complete search history.

(56) References Cited

U.S. PATENT DOCUMENTS

| | | | | |
|---|---|---|---|---|
| 5,894,633 A * | 4/1999 | Kaneko | ........... | 16/306 |
| 5,913,351 A * | 6/1999 | Miura | ........... | 16/340 |
| 6,446,308 B1 * | 9/2002 | Brewington et al. | ........... | 16/337 |
| 6,584,646 B2 * | 7/2003 | Fujita | ........... | 16/342 |
| 6,988,294 B2 * | 1/2006 | Birtley | ........... | 16/342 |
| 7,143,476 B2 * | 12/2006 | Minami | ........... | 16/340 |
| 7,832,054 B2 * | 11/2010 | Nakasone | ........... | 16/337 |

FOREIGN PATENT DOCUMENTS

| | | | |
|---|---|---|---|
| JP | 5-021080 A | | 3/1993 |
| JP | 5-324125 A | | 12/1993 |
| JP | 09196048 A | * | 7/1997 |
| JP | 09303032 A | * | 11/1997 |
| JP | 10047338 A | * | 2/1998 |
| JP | 10280781 A | * | 10/1998 |
| JP | 2001032823 A | | 2/2001 |
| JP | 2002106542 A | | 4/2002 |
| JP | 2002256841 A | | 9/2002 |
| JP | 2002261467 A | * | 9/2002 |
| JP | 2004116275 A | | 4/2004 |
| JP | 2005326937 A | | 11/2005 |
| JP | 2006125560 A | | 5/2006 |
| JP | 2008032986 A | | 2/2008 |

OTHER PUBLICATIONS

Japanese Office Action for JP2008-205754 issued Jun. 23, 2010.

* cited by examiner

*Primary Examiner* — William L. Miller (57) ABSTRACT

A tilt hinge includes a movable range fixed tilt hinge and a movable range switching member. The movable range fixed tilt hinge includes a spindle, a movable bracket rotatably arranged around the spindle and having a projecting piece, a fixed bracket fixed to the spindle, and a stopper fixed to the spindle and having first and second cam portions. The stopper restricts a moving range of the movable bracket within a first movable range by engaging the projecting piece with the first and the second cam portions. A friction imparting arrangement has a friction built between the movable bracket and the fixed bracket. The movable range switching member is enable to switch the moving range of the movable bracket between the first movable range and a second movable range smaller than the first movable range by a pushing operation.

8 Claims, 9 Drawing Sheets

RELATED ART

TILT HINGE CAPABLE OF EASILY SWITCHING A MOVABLE RANGE BY A PUSHING OPERATION

This application is based upon and claims the benefit of priority from Japanese patent application No. 2008-205754, filed on Aug. 8, 2008, the disclosure of which is incorporated herein in its entirety by reference.

BACKGROUND OF THE INVENTION

1. Technical Field

This invention relates to a tilt hinge which can change an angle of a display portion (a movable portion) such as a liquid crystal display unit to an apparatus body (a fixed portion).

2. Background Art

In the display portion (the movable portion) such as the liquid crystal display unit, a tilt hinge is used in order to adjust the angle thereof against the apparatus body (the fixed portion).

Various tilt hinges related to the present invention are already proposed. By way of example, Japanese Unexamined Utility Model Application Publication Jikkai No. Hei 5-21080 JP-U 5-21080 (which will be also called Patent Document 1) discloses a tilt hinge for OA equipment which is capable of possibly preventing abrasion of a friction member and of preventing a stop holding ability from lowering in a use open/close angle of a display body after be used for a long time. The tilt hinge requires to stably stop and hold the display body (the movable portion) against an apparatus main body (a fixed portion) at an arbitrary position in the use opening angle. The tilt hinge disclosed in Patent Document 1 comprises a mounting member, a rotation shaft, a switch pushing member, a thrust washer and a retaining washer, and a spring washer and a retaining washer. The mounting member comprises a mounting base mounted to the apparatus main body side and a bearing plate. The rotation shaft serves as a supporting member for the display body having at one portion a small-diameter portion born to a bearing hole in the bearing plate of the mounting member. The switch pushing member is mounted to a large-diameter portion of the rotation shaft. The thrust washer and the retaining washer are sandwiched between the switch pushing member and a side surface of the bearing plate with the small diameter portion of the rotation shaft inserted thereto. The spring washer and the retaining washer are arranged to another side surface of the bearing plate with the small-diameter portion of the rotation shaft inserted thereto. The tilt hinge having such a structure is configured to rotate only when the rotation shaft is subjected to a predetermined rotation torque by riveting an end portion of the small-diameter portion.

In the tilt hinge disclosed in Patent Document 1, the bearing plate has a projecting piece projected therefrom and the switch pushing member is provided with a cam portion. When the bearing shaft together with the rotation shaft rotates, it hits on the cam portion at a predetermined rotation angle (135 degrees). That is, the cam portion of the switch pushing member serves as a stopper which is engaged with the projecting piece projected from the bearing plate.

Japanese Unexamined Patent Application Publication of Tokkai No. 2001-32823 or JP-A 2001-32823 (which will be also called Patent Document 2), which corresponds to U.S. Pat. No. 6,421,878, discloses a tilting hinge for a portable computer having a body and a display screen. The tilting hinge disclosed in Patent Document 2 comprises a fixture, a rotating shaft, a first friction washer, a second friction washer, an elastic assembly, a set washer, a calked projection, and torque changing means. The fixture consists of a fixing plate portion to be fixed to the body of the portable computer and a bearing plate portion bent perpendicularly to the fixing plate portion. The rotating shaft consists of a fixing portion to be fixed to the display screen of the portable computer, a large-diameter portion and a small-diameter portion. The rotating shaft is born relatively rotatably in a bearing hole formed in the bearing plate portion of the fixture. The first friction washer is interposed between the large-diameter portion of the rotating shaft and one side of the bearing plate. The first friction washer is engaged with the rotating shaft on the bearing plate portion of the fixture. The second friction washer is provided at another side of the bearing plate and is engaged with the rotating shaft. The elastic assembly consists of a spring washer or spring washers, a belleville spring or belleville springs, a wave washer or wave washers. The elastic assembly is disposed to abut on the second friction washer. The set washer is disposed to abut on the elastic assembly rotatably with the rotating shaft. The calked projection is provided with an end portion of the small-diameter portion of the rotating shaft abutting on the elastic assembly. The torque changing means is for changing torque. The torque changing means comprises a convexity or concavity formed on the bearing plate portion and the first or the second friction washer on which there are formed a convexity or concavity opposite to the concavity or convexity on the bearing plate portion.

Japanese Unexamined Patent Application Publication of Tokkai No. 2002-266841 or JP-A 2002-266841 (which will be also called Patent Document 3) discloses a tilt hinge which is capable of keeping stable performance for a long period without using lubricant, of facilitating production and assembly, and of allowing the use of inexpensive plated steel sheet as a bearing plate. The tilt hinge comprises a mounting member, a spindle, a movable plate, a first movable friction boss and a first fixed friction boss, a second movable friction boss, a second fixed friction boss, a spring support washer, and a spring washer. The mounting member has a mounting base and the bearing plate. The mounted member is mounted on a fixing portion side. The spindle is journaled not to rotate in a bearing hole. The movable plate is rotatably mounted to the spindle to be movable in an axial direction. The first movable friction boas and the first fixed friction boss are disposed between one side face of the movable plate and the bearing plate so that the first movable friction boas is fixed to one side face of the movable plate and the fixed friction boss is fixed on one side face of the bearing plate. The second movable friction boss is fixed on the other side face of the movable plate. The second fixed friction boss is movable in a spindle direction and is inserted and fixed not to be rotatable. The spring support washer is fixed to the second fixed friction boss. The spring washer is disposed to be brought into contact with the spring support washer. By press-supporting from the other end side of the bearing plate of the spindle to apply load, friction force of each boss acts to control rotating torque of the movable plate thereby to keep an opening/closing portion disposed to the movable plate at an arbitral angle.

Patent Document 3 discloses an example where the movable friction boss has a protrusion and the fixed friction boss has a notch. When the movable friction boss rotates, the protrusion rotates with the protrusion guides along the notch and a rotating range is controlled by restraining the protrusion at both ends of the notch, thereby controlling the rotating range of an open/close portion mounted to the movable plate.

Japanese Unexamined Patent Application Publication of Tokkai No. 2005-326937 or JP-A 2005-326937 (which will be also called Patent Document 4) discloses a tilt hinge which is capable of simplifying and downsizing a friction torque control means. The tilt hinge disclosed in Patent Document 4 is configured of a bracket fixed to equipment main body such as a notebook-sized personal computer, a speed increasing rotary means fixed to the bracket and equipped with a planetary gear, a rotation member such as a display fixed to the input shaft of the speed increasing rotary means, and a friction torque control means disposed between the output shaft of the speed increasing rotary means and the bracket.

Japanese Unexamined Patent Application Publication of Tokkai No. Hei 5-32412 or JP-A 5-324125 (which will be also called Patent Document 5) discloses an angle adjusting device is capable of holding a display part at an optional inclined angle without laying down a display visual field angle adjusting device. In the angle adjusting device disclosed in Patent Document 5, a tilt bracket and a washer are inserted in a tilt spindle and the tilt spindle is crimped on the washer. The tilt spindle has one spindle into which an one-way clutch and an outer wheel are integrated. The outer wheel is provided with a mounted portion for a display case.

Japanese Unexamined Patent Application Publication of Tokkai No. 2004-116275 or JP-A 2004-116275 (which will be also called Patent Document 6) discloses a hinge device using a flange type pipe spring. The hinge device disclosed in Patent Document 6 comprises a first bracket having a pair of axial holes, a pair of flange type pipe springs inserted in the axial holes, a pair of shafts piercingly fitted into through holes of the flange type pipe springs, and a second bracket fixed to one ends of the pair of shafts. At sides where flanges of the pair of flange type pipe springs are positioned, end portions of the pair of shafts are pressure-inserted and fixed to a pair of insertion holes of the second bracket. The first bracket comprises a pair of rising members each having an edge on which an arc-shaped guide groove is formed. The arc-shaped guide groove has a constant angular section (a varying angle of a monitor or the like) on the circumference that has a circular center identical with a rotational center of the shaft. The second bracket has a stopper formed therein. With this structure, it is possible to set (confine) a rotational angle of the hinge device.

In the manner as disclosed in the above-mentioned Patent Documents 1 to 6, conventional tilt hinges, which are used in OA equipment including the liquid crystal display unit, carry out an angular adjustment within a predetermined movable range on moving an angle of the display unit.

Inasmuch as the conventional tilt hinge has one kind of fixed movable range, it is called a movable range fixed tilt hinge.

Herein, there is a case where one of, for example, a first range between 0 degree and 90 degrees and a second range between 0 degree and 40 degrees is required as the predetermined movable range. In this event, it is necessary to prepare two kinds of movable range fixed tilt hinges having different movable ranges. Specifically, it is necessary to prepare a first movable range fixed tilt hinge having a first movable range between 0 degree and 90 degrees and a second movable range fixed tilt hinge having a second movable range between 0 degree and 40 degree. It results in causing a problem such that it becomes high cost.

On the other hand, various prior art documents related to the present invention, each of which is capable of changing a movable range, are known.

By way of example, Japanese Unexamined Patent Application Publication of Tokkai No. 2002-106542 or JP-A 2002-106542 (which will be also called Patent Document 7) discloses a display monitor with a tilting mechanism which is capable of changing a motion angle range even when normally used (when viewed by a user) or maintained. In Patent Document 7, a hinge comprises a coupling member (a shaft) for relatively and rotatably coupling a first member of a stand side with a second member of a monitor body side. The first member has a groove serving as a fitting space for a tilt angle limitation while the second member has a tilt angle limitation projection for movably fitting in the groove. The first member has a stopper projection serving as a moving limitation hitting portion. A cover, which is removable to the stand, has a plate-shaped stopper contact portion at the inside thereof. When normal used, the stopper projection hits to the stopper contact portion. When maintained, the tilt angle limitation projection makes contact with an end portion of the groove. By mounting and demounting the cover, a maximum rotating angle of the monitor body is switched. Specifically, when the cover is mounted, the rotating angle of the monitor body is limited so as to become narrow. When the cover is demounted, the rotating angle of the monitor body is set so as to become wide.

In the above-mentioned Patent Document 7, a removable member (e.g. the cover) is required. When the removable member is demounted, there is a fear to lose it.

Japanese Unexamined Patent Application Publication Tokkai No. 2008-32986 or JP-A 2008-32986 (which will be also called Patent Document 8), which corresponds to U.S. Patent Application Publication No. US 2008/0024750, discloses an image reading apparatus which is capable of simply setting an open/close angle of a document cover of the image reading apparatus at a plurality of stages. In the image reading apparatus disclosed in Patent Document 8, a document cover is located above a document positioning glass plate. The document cover serves as a cover member for pressing a document against the document positioning glass plate and is openably and closably attached to an apparatus body via a hinge member. The hinge member is rotatably supported by a shaft with a hole. A switch member is attached to the apparatus body via a spring. When the hinge member rotates around the shaft, a bump of the hinge member makes contact with a bump of the switch member at a position where the hinge member is open at a rotation angle of approximately 70 degrees with respect to the document positioning glass plate. When the switch member is pressed downward, a clearance is formed that allows the bump of the hinge member to further rotate. As a result, the document cover can be opened via the hinge member to be positioned below the document setting surface of the document positioning glass plate. In this state, the hinge member has the open angle of 180 degrees.

Although the hinge member disclosed in Patent Document 8 mounts the document cover to apparatus body openably and closably, it merely selects the open angle using the switch member. In other words, the hinge member disclosed in Patent Document 8 is different from a tilt hinge for stopping and holding an open/close portion (a movable portion) against a fixed portion at an arbitrary angle within a movable range.

SUMMARY

An exemplary object of the invention is to provide a tilt hinge which is capable of easily switching a movable range by a simple operation.

A movable range switching tilt hinge according to an exemplary aspect of the invention includes a movable range fixed tilt hinge and a movable range switching member. The movable range fixed tilt hinge includes a spindle extending in an axial direction, a movable bracket rotatably arranged around the spindle and having a projecting piece, a fixed bracket fixed to the spindle, a stopper fixed to the spindle and having first and second cam portions. The stopper restricts a moving range of the movable bracket within a first movable range by engaging the projecting piece with the first and the second cam portions. A friction imparting arrangement has a friction built between the movable bracket and the fixed bracket. The movable range switching member is mounted on the movable bracket. The movable range switching member is able to switch the moving range of the movable bracket between the first movable range and a second movable range smaller than the first movable range. The movable bracket includes a movable plate extending in a direction orthogonal to the axial direction of the spindle. The movable range switching member includes a shaft extending in parallel with the axial direction of the spindle, the shaft being movably mounted in the axial direction against the movable plate, and a movable metal sheet mounted to the shaft and having a protrusion piece. The movable metal sheet moving the protrusion piece, by moving in the axial direction, between a first position at which the protrusion piece is able to be engaged with said first cam portion and a second position at which the protrusion piece is unable to be engaged with said first cam portion. The movable range switching tilt hinge switches the moving range of the movable bracket to the second movable range when the protrusion piece is moved to the first position.

BRIEF DESCRIPTION OF THE DRAWINGS

The above feature and advantages of the present invention will be more apparent from the following description of certain exemplary embodiments taken in conjunction with the accompanying drawing, in which.

DETAILED DESCRIPTION OF EXEMPLARY EMBODIMENT

Figure 1:
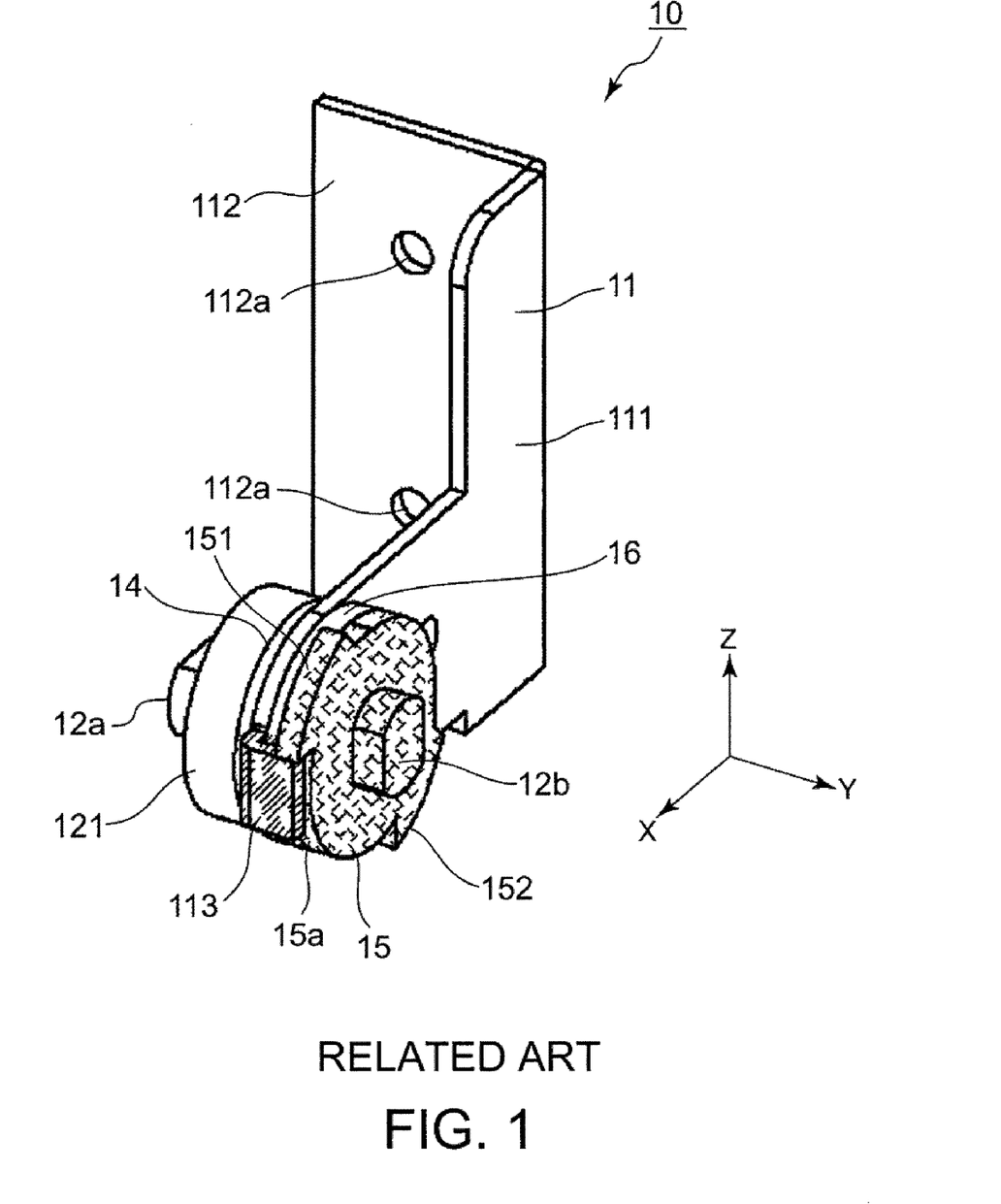
FIG. 1 is a perspective view showing a related tilt hinge (a movable range fixed tilt hinge)
Figure 2:
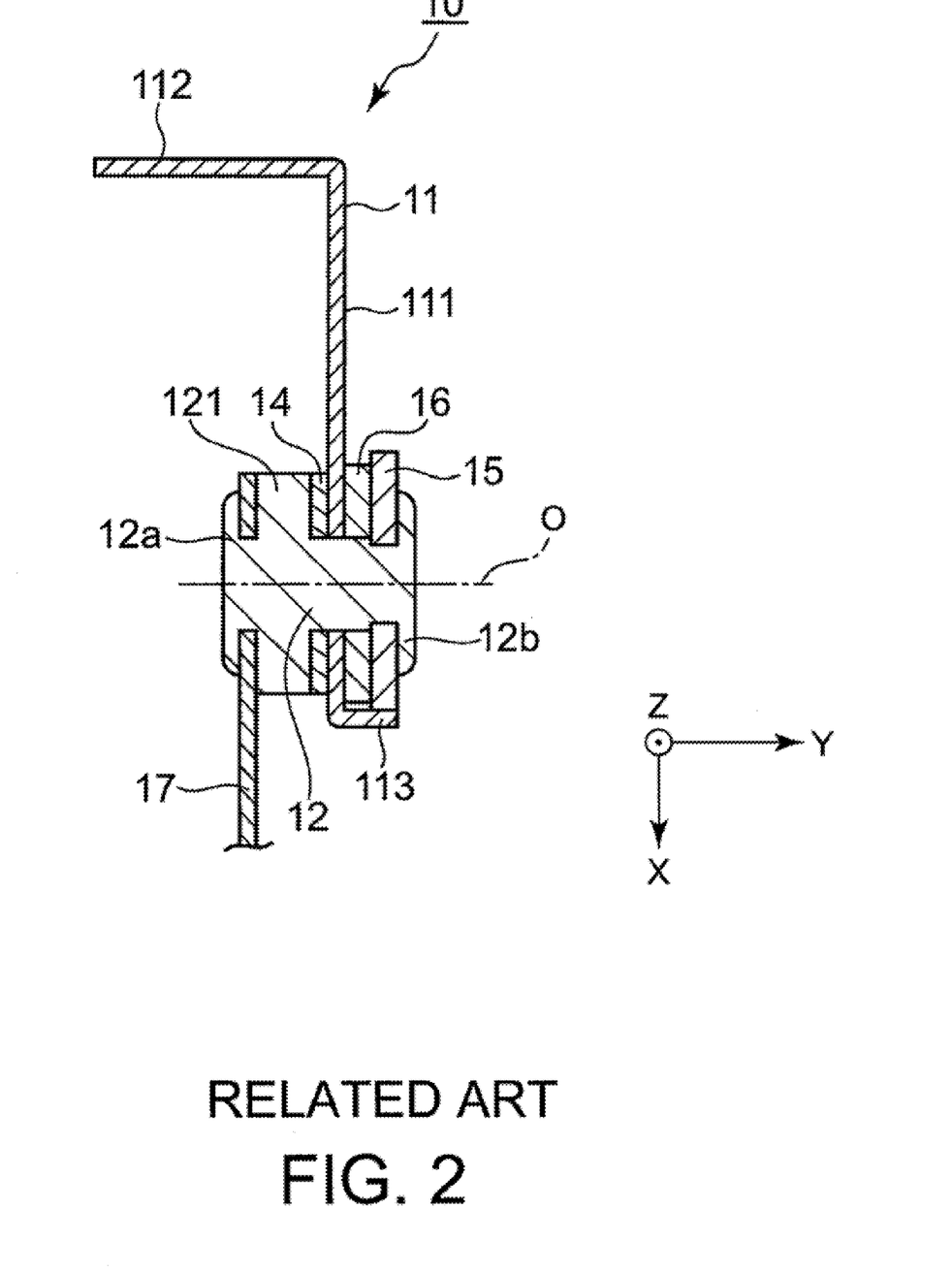
FIG. 2 is a plan cross-sectional view of the related tilt hinge illustrated in FIG. 1.

Referring to FIGS. 1 and 2, description will be at first directed to a related tilt hinge 10 in order to facilitate an understanding of the present invention. FIG. 1 is a perspective view of the tilt hinge 10. FIG. 2 is a plan cross-sectional view of the tilt hinge 10. Herein, in the manner shown in FIGS. 1 and 2, an orthogonal coordinate system (X, Y, Z) is used. In a state illustrated in FIGS. 1 and 2, in the orthogonal coordinate system (X, Y, Z), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 and 2, the left-and-right direction Y is a direction of an axis O of rotation in the tilt hinge 10.

The tilt hinge 10 comprises a first bracket 11 which is rotatable around a spindle 12 which will later be described. The first bracket 11 is called a movable bracket. The first bracket 11 comprises a movable plate 111, a mounting piece 112, and a projecting piece 113. The movable plate 111 extends in a plane defined by the X-axis and the Y-axis. The mounting piece 112 is bent at one end portion of the movable plate 111 leftwards in a direction perpendicular thereto. The projecting piece 113 is bent at another end portion of the movable plate 111 rightwards in the direction perpendicular thereto. The mounting piece 112 has mounting holes 112a through which a liquid crystal display unit (a movable portion) (not shown) is mounted.

The spindle 12 extends in the left-and-right direction Y. That is, the spindle 12 has an axial direction which is the left-and-right direction Y. Accordingly, the movable plate 111 of the above-mentioned first bracket 11 extends in a direction perpendicular to the axial direction of the spindle 12. The spindle 12 has a left-hand end portion 12a and a right-hand end portion 12b.

The spindle 12 comprises a large-diameter portion 121 which is located on left side of the movable plate 111. Between the large-diameter portion 121 and the movable plate 111, a friction plate 14 is sandwiched. On left side of the spindle 12, a second bracket 17 is fixed to the spindle 12 by crimping the left-hand end portion 12a of the spindle 12. The second bracket 17 is called a fixed bracket. The second bracket 17 is mounted to an apparatus main body (a fixed portion) (not shown).

In FIG. 1, illustration of the second bracket (the fixed bracket) 17 is omitted.

On right side of the movable plate 111, a stopper 15 is fixed to the spindle 12 by crimping the right-hand end portion 12b of the spindle 12. Between the stopper 15 and the movable plate 111, a spring plate 16 is sandwiched. A combination of the friction plate 14 and the spring plate 16 serves as a friction imparting arrangement for imparting friction between the first bracket (the movable bracket) 11 and the second bracket (the fixed bracket) 17.

Although the friction imparting arrangement comprises the combination of the friction plate 14 and the spring plate 16 in the example being illustrated, as a matter of course, the friction imparting arrangement is not restricted thereto.

The stopper 15 comprises first and second cam portions 151 and 152 which project from the spindle 12 (the axis O of rotation) in a radial direction outwards. In other words, the stopper 15 has a guide notch 15a for guiding the projecting piece 113 between the first cam portion 151 and the second cam portion 152. Accordingly, the first bracket 11 rotates around the spindle 12 (the axis O of rotation) with the projecting piece 113 guided along the guide notch 15a.

At the first and the second cam portions 151 and 152, which are located at both ends of the guide notch 15a, the projecting piece 113 is stopped and therefore a movable range of the first bracket 11 is limited. Thereby, a movable range of the liquid crystal display unit (not shown) mounted to the first bracket 11 is limited.

At any rate, by engaging the projection piece 113 with the first and the second cam portions 151 and 152, the stopper 15 restricts a moving range of the first bracket (the movable bracket) 11 within a predetermined movable range. In the example being illustrated, the predetermined movable range is equal to a range between 0 degree and 90 degrees. In addition, the predetermined movable range may be changed by removing allocation positions of the first and the second cam portions 151 and 152 on the stopper 15. In other words, the predetermined movable range may not be limited to the range between 0 degree and the 90 degrees.

In the manner which is described above, inasmuch as the related tilt hinge 10 has one kind of fixed movable range, it is called a movable range fixed tilt hinge.

Herein, there is a case where one of, for example, a first range between 0 degree and 90 degrees and a second range between 0 degree and 40 degrees is required as the predetermined movable range. In this event, it is necessary to prepare two kinds of movable range fixed tilt hinges having different movable ranges. Specifically, it is necessary to prepare a first movable range fixed tilt hinge having a first movable range between 0 degree and 90 degrees and a second movable range fixed tilt hinge having a second movable range between 0 degree and 40 degree. It results in causing a problem such that it becomes high cost, as mentioned in the preamble of the instant specification.

Figure 3:
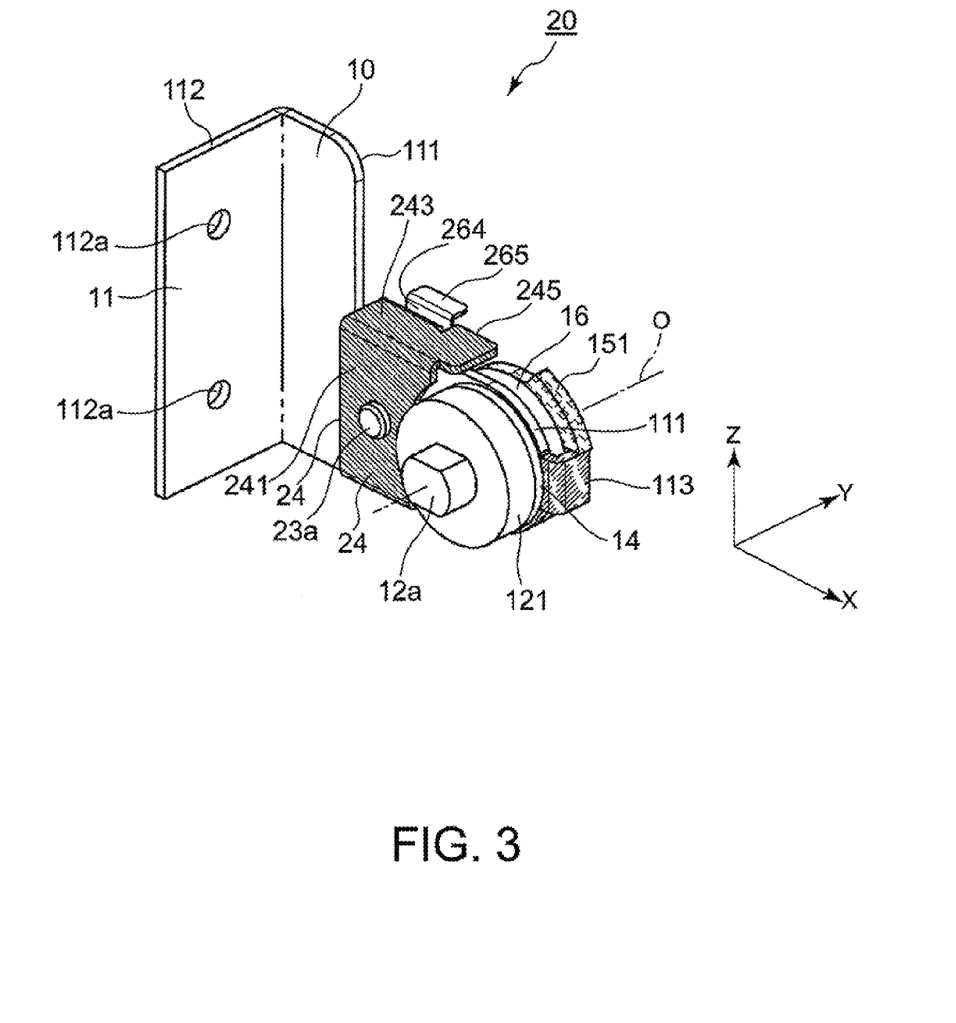
FIG. 3 is a perspective view showing a tilt hinge (a movable range switching tilt hinge) according to an exemplary embodiment of the present invention.
Figure 4:
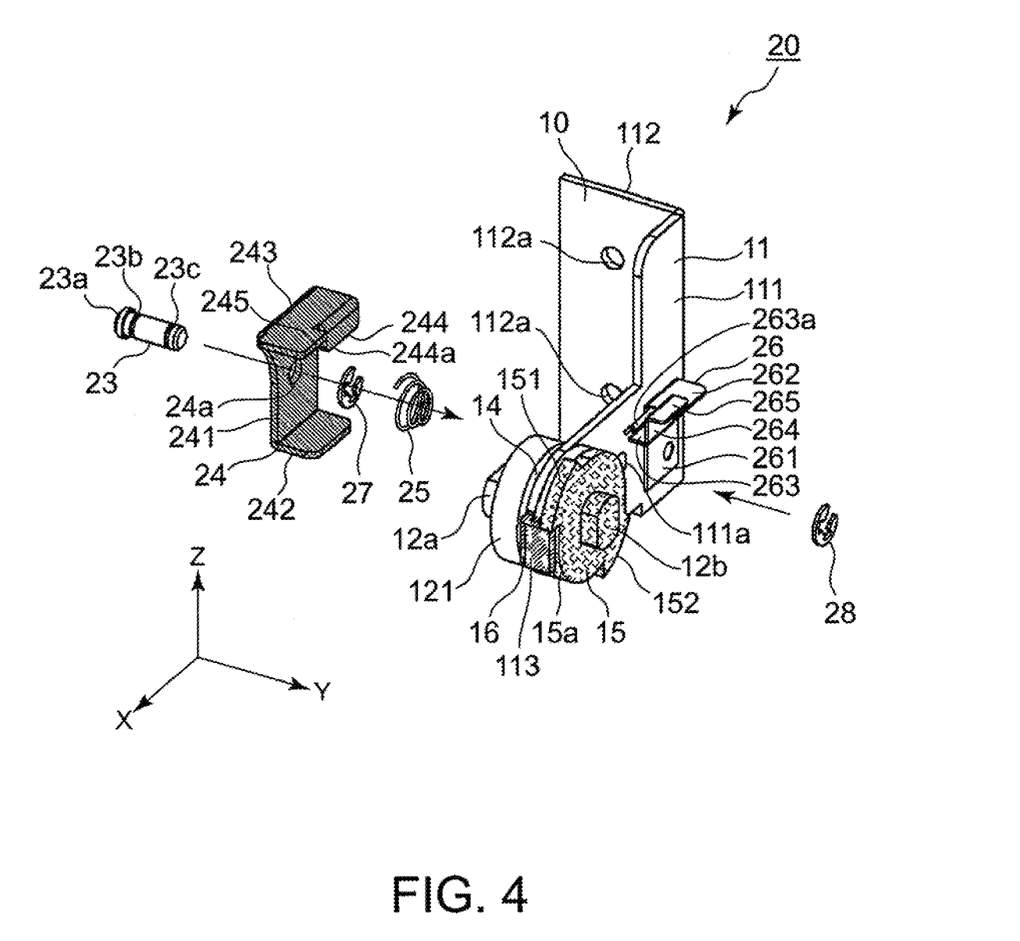
FIG. 4 is an exploded perspective view of the tilt hinge illustrated in FIG. 3.

Referring to FIGS. 3 and 4, the description will proceed to a movable range switching tilt hinge 20 according to an exemplary embodiment of the present invention. FIG. 3 is an external perspective view of the movable range switching tilt hinge 20. FIG. 4 is an exploded perspective view of the movable range switching tilt hinge 20. Herein, in the manner shown in FIGS. 3 and 4, an orthogonal coordinate system (X, Y, Z) is used. In a state illustrated in FIGS. 3 and 4, in the orthogonal coordinate system (X, Y, Z), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 3 and 4, the left-and-right direction Y is a direction of an axis O of rotation in the movable range switching tilt hinge 20.

The movable range switching tilt hinge 20 is configured by combining the related tilt hinge (the movable range fixed tilt hinge) 10 illustrated in FIG. 1 with a movable range switching member which will later be described. Accordingly, similar reference symbols are attached to those having functions similar to those illustrated in FIGS. 1 and 2 and description thereof is omitted for purposes of simplification of description.

In FIGS. 3 and 4, illustration of the second bracket (the fixed bracket) 17 illustrated in FIG. 2 is omitted also.

Herein, on convenience of description, the above-mentioned predetermined movable range of the related tilt hinge (the movable range fixed tilt hinge) 10 will be called a first movable range.

The movable range switching tilt hinge 20 is configured by combining the related tilt hinge (the movable range fixed tilt hinge) 10 with the movable range switching member (which will later be also called "added members") which comprises a shaft 23, a movable metal sheet 24, a taper coil spring 25, a spring stopper 26, and first and second E-shaped rings 27 and 28. The added members (the movable range switching member) 23 to 28 are mounted to the movable plate 111 of the first bracket (the movable bracket) 11 in the manner which will later become clear.

In the manner which become clear as the description proceeds, the movable range switching member (23 to 28) is enable to switch a moving range of the first bracket (the movable bracket) 11 between the first movable range and a second movable range narrower than the first movable range by pushing operation so as to enable to limit to the second movable range.

The shaft 23 extends in the left-and-right direction Y. Specifically, the shaft 23 extends in parallel with an axial direction of the spindle 12 and is mounted to the movable plate 111 so as to enable to move in the axial direction.

The movable metal sheet 24 has a through hole 24a through which the shaft 23 passes. The movable metal sheet 24 is disposed so as to enable to move in the left-and-right direction Y along the shaft 23. Specifically, the movable metal sheet 24 comprises a metal sheet body 241, a first end plate 242, and a second end plate 243. The metal sheet body 241 extends in parallel with the movable plate 111. The first end plate 242 is bent at one end (a lower end in FIG. 4) of the metal sheet body 241 in a direction perpendicular thereto rightwards. The second end plate 243 is bent at another end (an upper end in FIG. 4) of the metal sheet body 241 in a direction perpendicular thereto rightwards. Accordingly, the first end plate 242 and the second end plate 243 are disposed opposite to each other via the metal sheet body 241. The metal sheet body 241 has a through hole 24a. The metal sheet body 241 is disposed on left side of the movable plate 111. As a result, the movable plate 111 is sandwiched between the first and the second end plates 242 and 243.

In addition, the movable metal sheet 24 further comprises an engaging piece 244 and a protrusion piece 245. The engaging piece 244 is bent at a right end of the second end plate 243 in a rear side in a direction perpendicular thereto downwards. The protrusion piece 245 protrudes at the right end of the second end plate 243 in a front side rightwards. At any rate, the engaging piece 244 is bent at a tip of the second end plate 243 at right angles nearer to the first end plate 242. The engaging piece 244 is for be engaged with the spring stopper 26 in the manner which will later be described. The protrusion piece 245 is for be engaged with the first cam portion 151 of the stopper 15 in the manner which will later be described.

In the manner which will become clear as the description proceeds, the movable metal sheet 24 is enable to move the protrusion piece 245 between a first position which is enable to be engaged with the first cam portion 151 and a second position which is disable to be engaged with the first cam portion 151. Therefore, when the protrusion piece 245 is moved to the first position, the movable range switching tilt hinge 20 can switch the moving range of the first bracket (the movable bracket) 11 to the second movable range.

In addition, when the protrusion piece 245 is moved to the second position, the movable range switching tilt hinge 20 can switch the moving range of the first bracket (the movable bracket) 11 to the first movable range in the manner which is similar to the related tilt hinge (the movable range fixed tilt hinge) 10.

Between the metal sheet body 241 of the movable metal sheet 24 and the movable plate 111 of the first bracket 11, the first E-shaped ring 27 and the taper coil spring 25 are disposed. The shaft 23 has a large-diameter portion (a head portion) 23a on left side thereof. In the vicinity of large-diameter portion (the head portion) 23a, the shaft 23 has a first ring-shaped groove 23b formed thereon. After the shaft 23 is inserted in the through hole 24a of the metal sheet body 241 of the movable metal sheet 24, the first E-shaped ring 27 is fitted to the first ring-shaped groove 23b of the shaft 23. Accordingly, the movable metal sheet 23 is mounted to the shaft 23 with the metal sheet body 241 of the movable metal sheet 24 sandwiched between the large-diameter portion 23a of the shaft 23 and the first E-shaped ring 27.

Inasmuch the taper coil spring 25 is disposed between the metal sheet body 241 of the movable metal sheet 24 and the movable plate 111 of the first bracket 11, the metal sheet body 241 of the movable metal sheet 24 is always urged in a direction away from the movable plate 111 of the first bracket 11 (leftwards) by the taper coil spring 25. That is, the taper coil spring 25 serves as an urging arrangement for urging the movable metal sheet 24 in the direction away from the movable plate 111 to move the protrusion piece 245 in a direction of the second position. In addition, although the taper coil spring 25 is used as the urging arrangement in this exemplary embodiment, the urging arrangement is not restricted to a spring such as the taper coil spring 25 and may be one of various members.

The movable plate 111 of the first bracket 11 has a through hole 111a through which the shaft 23 passes. Accordingly, the shaft 23 passes through the through hole 24a of the movable metal sheet 24, the first E-shaped ring 27, the taper coil spring 25, and the through hole 111a of the movable plate 111 and projects into the right side of the movable plate. The shaft 23 has a second ring-shaped groove 23c on the right side thereof. The second E-shaped ring 28 is fitted to the second ring-shaped groove 23c of the shaft 23 with a right hand end portion of the shaft 23 projected from the through hole 111a of the movable plate 111. The second E-shaped ring 28 extends in the same plane of a plane in which the engaging piece 244 of the movable metal sheet 24 extends.

The spring stopper 26 is made of a material of a leaf spring. The spring stopper 26 is connected to a right hand wall of the movable plate 111 of the first bracket 11 by spot welding. The spring stopper 26 is for being engaged with the engaging piece 244 of the movable metal sheet 24.

More specifically, the spring stopper 26 comprises a mounted portion 261 mounted on the right hand wall of the movable plate 111 of the first bracket 11 and a bent portion 262 bent at an upper end of the mounted portion 261 in a direction perpendicular thereto on the right side. The bent portion 262 extends at the substantially same position of a tip 244a of the engaging portion 244 of the movable metal sheet on a plane orthogonal to the movable plate 111. At a front end of the bent portion 262 on a right side thereof, an extending portion 263 extends on the same plane of a plane in which the bent portion 262 extends forwards. From a right end of the extending portion 263, a vertical portion 264 is bent in a direction orthogonal thereto upwards. From an upper end of the vertical portion 264, a pushing portion 265 is bent in a direction orthogonal thereto rightwards. The pushing portion 265 extends on the same plane of a plane in which the second end portion 243 of the movable metal sheet 24. The extending portion 263 has an engaging protrusion 263a at a left end thereof that is engaged with the tip 244a of the engaging piece 244 of the movable metal sheet 24.

At any rate, the spring stopper 26 serves as an engaging member which is mounted on the movable plate 111 and which is engaged with the movable metal sheet 24 to keep the protrusion piece 245 of the movable metal sheet 24 at the first position when the movable metal sheet 24 is moved nearer to the movable plate 111 against an urging force of the urging arrangement (the taper coil spring 25). When the protrusion piece 245 of the movable metal sheet 24 is kept at the first position, the engaging protrusion 263a is engaged with the tip 244a of the engaging piece 244 of the movable metal sheet 24.

The pushing portion 265 is for disengaging an engagement between the tip 244a of the engaging piece 244 of the movable metal sheet 24 and the engaging protrusion 263a. In addition, when the engagement between the tip 244a of the engaging piece 244 of the movable metal sheet 24 and the engaging protrusion 263a is disengaged, the engaging piece 244 of the movable metal sheet 24 is engaged with the movable plate 111 of the first bracket (the movable bracket) 11 to keep the protrusion piece 245 of the movable metal sheet 24 at the second position.

Although the pushing portion 265 is bent at the upper and of the vertical portion 264 in the direction orthogonal thereto rightwards in the example being illustrated, a position at which the pushing portion 265 is located is not be limited thereto, the pushing portion may be located an any position of the spring stopper 26 if the engagement between the tip 244a of the engaging piece 244 of the movable metal sheet 24 and the engaging protrusion 263a is disengaged.

Figure 5:
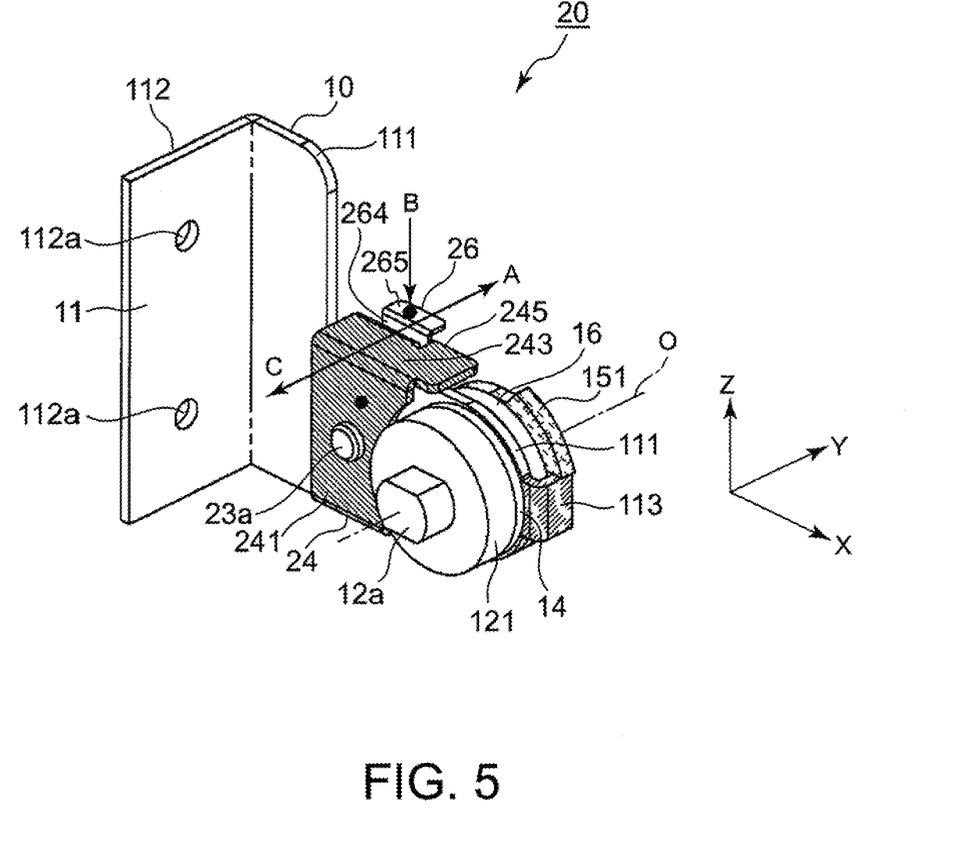
FIG. 5 is a perspective view of the tilt hinge for use in describing operation of a movable metal sheet in the tilt hinge illustrated in FIG. 3.
Figure 6:
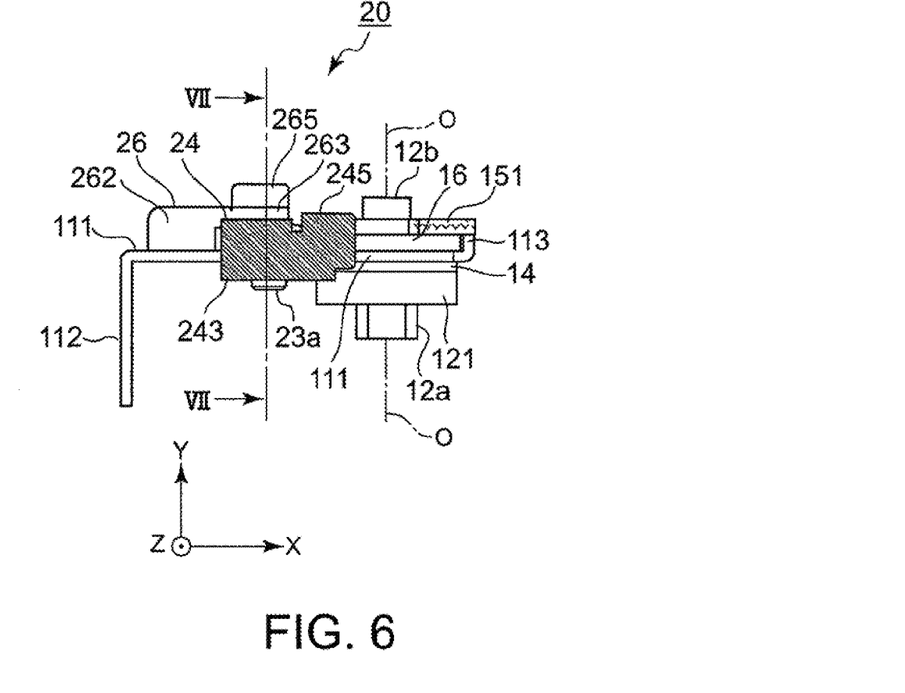
FIG. 6 is a plan view showing a state where the movable metal sheet is moved nearer to a movable plate by pushing a metal sheet body of the movable metal sheet toward the right.
Figure 7:
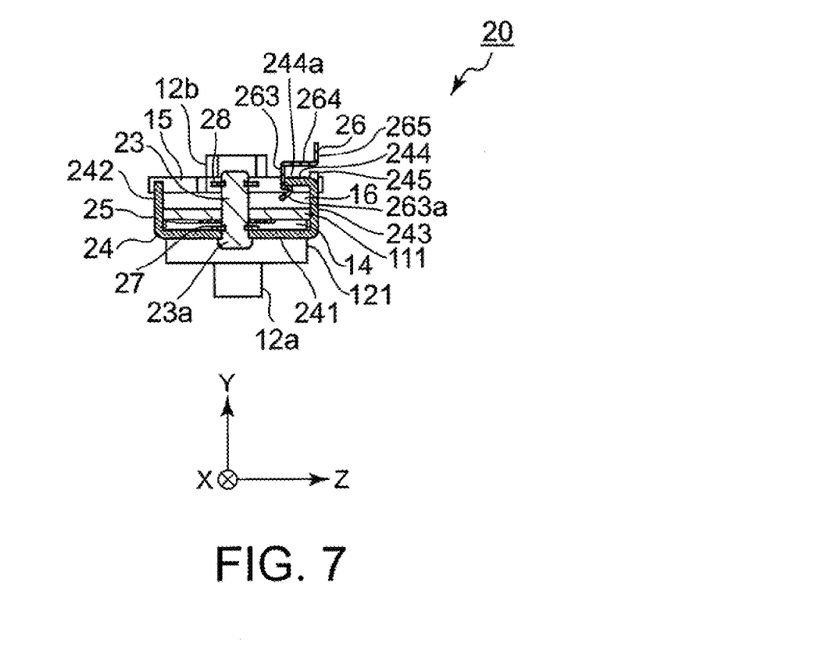
FIG. 7 is a cross-sectional view taken on line VII-VII of FIG. 6.
Figure 8:
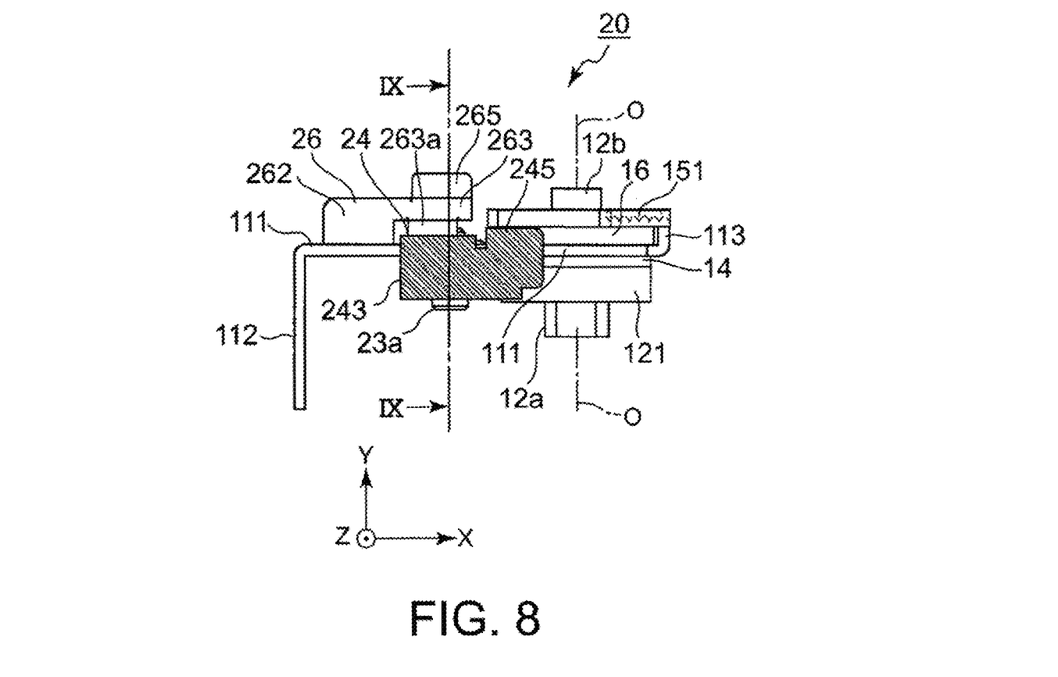
FIG. 8 is a plan view showing a stage where the movable metal sheet is moved away from the movable plate by pushing a pushing portion of a spring stopper downwards.
Figure 9:
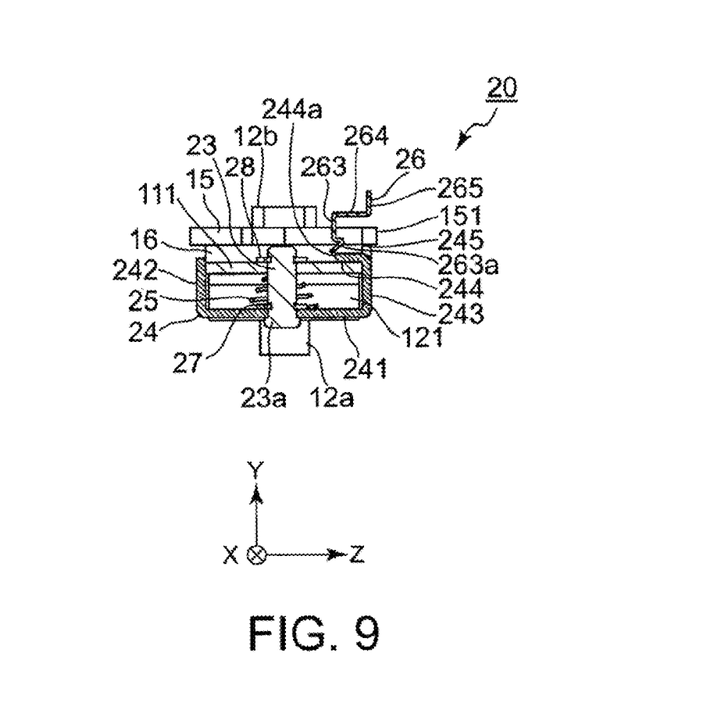
FIG. 9 is a cross-sectional view taken on line IX-IX of FIG. 8.

Referring now to FIGS. 5 through 9, description will be made as regards operation of the movable metal sheet 24. FIG. 5 is a perspective view of the tilt hinge 20 for use in describing the operation of the movable metal sheet 24. FIG. 6 is a plan view showing a state where the movable metal sheet 24 is moved nearer to the movable plate 111 by pushing the metal sheet body 241 of the movable metal sheet 24 toward the right. FIG. 7 is a cross-sectional view taken on line VII-VII of FIG. 6. FIG. 8 is a plan view showing a state where the movable metal sheet 24 is moved away from the movable plate 111 by pushing the pushing portion 265 of the spring stopper 26 downwards. FIG. 9 is a cross-sectional view taken on line IX-IX of FIG. 8.

Referring at first to FIGS. 5 through 7, the description will be made as regards operation in a case where the metal sheet body 241 of the movable metal sheet 24 is pushed rightwards as shown in an arrow A of FIG. 5. It will be assumed that an operator (not shown) pushes the metal sheet body 241 of the movable metal sheet 24 rightwards against an urging force of the tape coil spring 25 as shown in the arrow A of the FIG. 5. In this event, the taper coil spring 25 is compressed by a pushing force of the metal sheet body 241 of the movable metal sheet 24 as shown in FIG. 7. Therefore, the metal sheet body 241 of the movable metal sheet 24 moves rightwards (nearer to the movable plate 111) with the first and the second end plates 242 and 243 of the movable metal sheet 24 slidably moved on the both ends of the movable plate 111 of the first bracket 11. And, by pushing the metal plate body 241 of the movable metal plate 24 to a certain extent, the tip 244a of the engaging piece 244 of the movable metal sheet 24 is engaged with the engaging protrusion 263a of the extending portion 263 of the spring stopper 26. Accordingly, thereafter if the pushing of the metal sheet body 263 of the movable metal sheet 26 stops, the movable metal sheet 24 is put into a state as shown in FIGS. 6 and 7.

In the manner which is described above, it is possible to push the movable metal sheet 24 against the movable range switching tilt hinge 20 rightwards (nearer to the movable plate 111). In this state, the protrusion piece 245 of the movable metal sheet 24 is put into at the first position which is enable to be engaged with the first cam portion 151 of the stopper 15 when the stopper 15 rotates around the spindle 12 (the axis O of rotation), as shown in FIG. 6.

Referring now FIGS. 5, 8, and 9, the description will be made as regards operation in a case where the pushing portion 265 of the spring stopper 26 is pushed downwards as shown in an arrow B of FIG. 5. It will presumed that the operator (not shown) pushes the pushing portion 265 of the spring stopper 26 downwards as shown in the arrow B of FIG. 5. In this event, the above-mentioned engagement between the tip 244a of the engaging piece 244 of the movable metal sheet 24 and the engaging protrusion 263a of the extending portion 263 of the spring stopper 26 is disengaged. Therefore, by the urging force of the taper coil spring 25, the metal sheet body 241 of the movable metal sheet 24 is moved leftwards (away from the movable plate 111) with the first and the second end plates 242 and 243 of the movable metal sheet 24 slidably moved on the both ends of the movable plate 111 of the first bracket 11 as shown in an arrow C of FIG. 5. When the metal sheet body 241 of the movable metal sheet 24 moves leftwards to a certain extent, the engaging piece 244 of the movable metal sheet 24 and the second E-shaped ring 28 fitted in the shaft 23 come in contact with (are engaged with) the right hand wall of the movable plate 111 of the first bracket 11. Thereafter, if pushing against the pushing portion 265 of the spring stopper 26 stops, the movable metal sheet 24 is put into the state as shown in FIGS. 8 and 9.

In the manner which is described above, it is possible to pushing (returning) the movable metal sheet 24 against the movable range switching tilt hinge 20 leftwards (away from the movable plate 111). In this state, the projecting piece 245 of the movable metal sheet 24 is put into at the second position which is disable to be engaged with the first cam portion 151 of the stopper (i.e. a position disengaged from the engagement for the first cam portion 151) if the stopper 15 rotates around the spindle 12 (the axis O of rotation).

Figure 10:
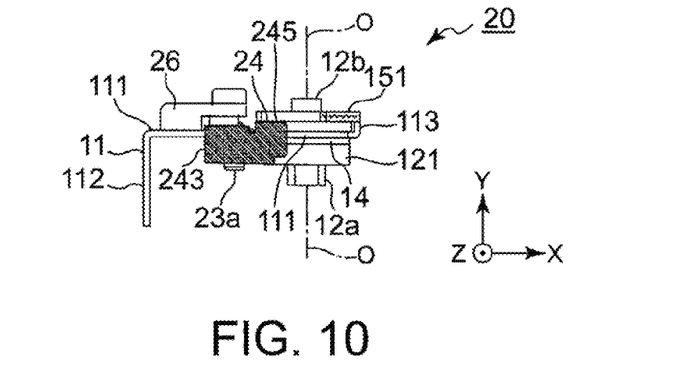
FIG. 10 is a plan view of the tilt hinge that is similar to FIG. 8.
Figure 11:
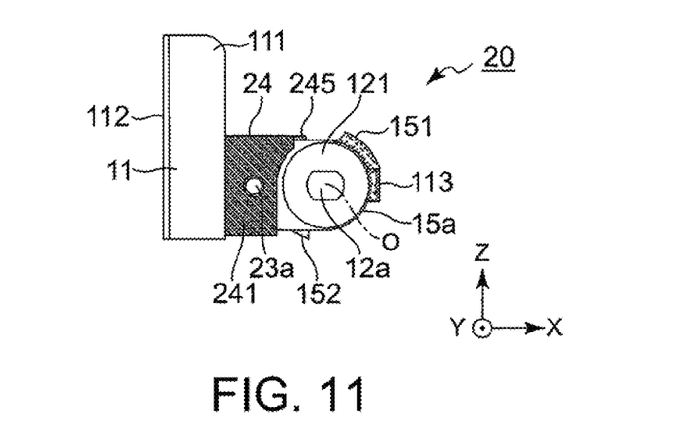
FIG. 11 is a left-hand side view of the tile hinge illustrated in FIG. 10.
Figure 12:
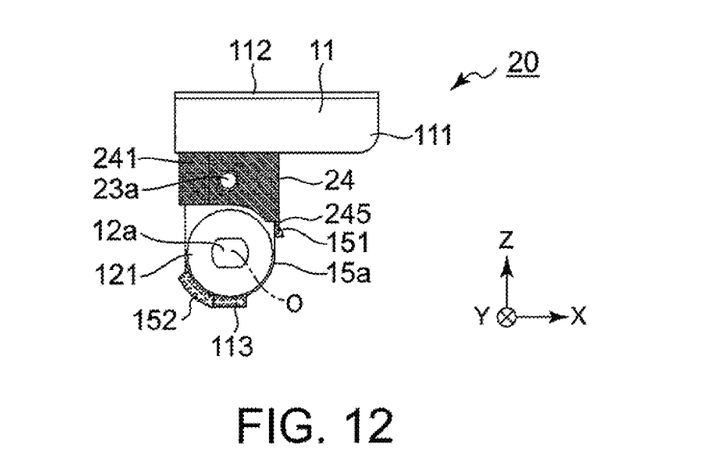
FIG. 12 is a left-hand side view showing a state where a first bracket of the hilt hinge rotates around an axis of rotation to move it.
Figure 13:
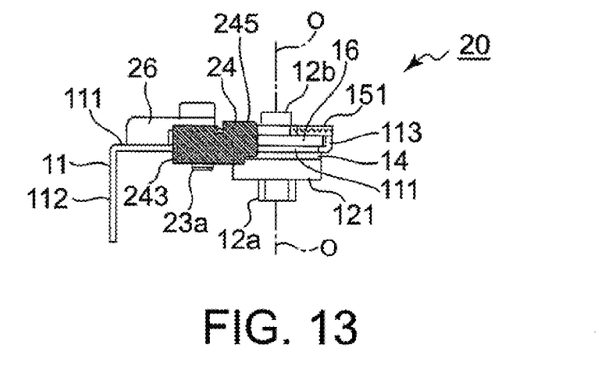
FIG. 13 is a plan view of the tilt hinge that is similar to FIG. 6.
Figure 14:
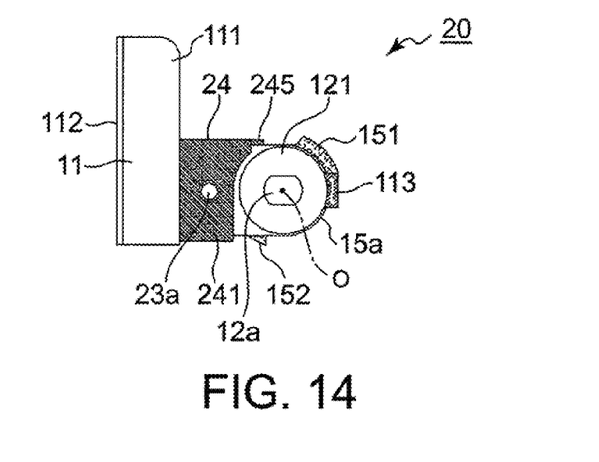
FIG. 14 is a left-hand side view of the tile hinge illustrated in FIG. 13.
Figure 15:
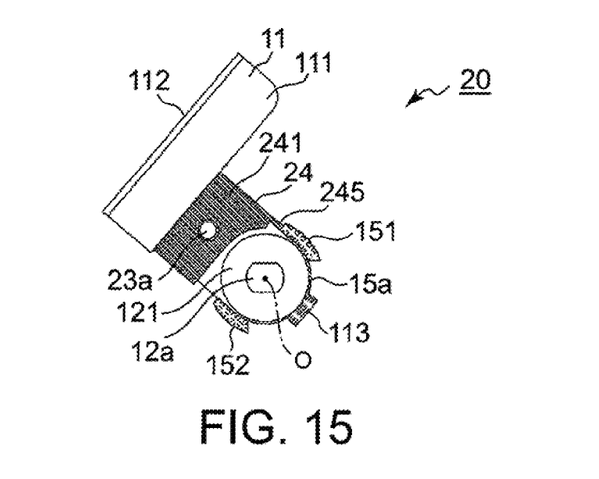
FIG. 15 is a left-hand side view showing a state where the first bracket of the tilt hinge rotates around the axis of rotation to move it.

Referring now to FIGS. 10 through 15, description will be made as regards operation of the movable range switching tilt hinge 20. FIGS. 10 through 12 are views for use in describing operation of the movable range switching tilt hinge 20 in the state where the movable metal sheet 24 moves leftwards (i.e. the state where the protrusion piece 245 of the movable metal sheet 24 is put into at the second position at which it cannot be engaged with the first cam portion 151). FIGS. 13 through 15 are views for use in describing operation of the movable range switching tilt hinge 20 in the state where the movable metal sheet 24 moves rightwards (i.e. the state where the protrusion piece 245 of the movable metal sheet 24 is put into at the first position at which is can be engaged with the first cam portion 151).

Referring at first to FIGS. 10 through 12, the description will be made as regards operation of the movable range switching tilt hinge 20 at the state where the movable metal sheet 24 moves leftwards (away from the movable plate 111). FIG. 10 is a plan view of the movable range switching tilt hinge 20 that is similar to FIG. 8. FIG. 11 is a left-hand side view of the movable range switching tilt hinge 20 illustrated in FIG. 10. FIG. 12 is a left-hand side view showing a state where the first bracket 11 of the movable range switching tilt hinge 20 rotates around the axis O of rotation to move it.

In an initial state, the projecting piece 113 of the first bracket (the movable bracket) 11 is engaged with (comes in contact with) the first cam portion 151 of the stopper 15. Herein, it will be assumed that an angle of the first bracket (the movable bracket) 11 in the initial state is equal to 0 degree. In this state, it will be assumed that the first bracket (the movable bracket) 11 is rotated around the spindle 12 (the axis O of rotation) in a clockwise direction. In this event, the first bracket (the movable bracket) 11 rotates around the spindle 12 (the axis O of rotation) with the projecting piece 113 of the first bracket (the movable bracket) 11 guided on the guide notch 15a. And finally, the first bracket (the movable bracket) 11 rotates around the spindle 12 (the axis O of rotation) until a position at which the projecting piece 113 of the first bracket (the movable bracket) 11 is engaged with (comes in contact with) the second cam portion 152 of the stopper 15 (i.e. a position where the first bracket (the movable bracket) 11 rotates around in the clockwise direction at 90 degrees). Accordingly, at this position in question, rotation of the first bracket (the movable bracket) 11 is restrained.

It is therefore possible to stop and keep the first bracket (the movable bracket) 11 at an arbitrary angular position within the first movable range between 0 degree and 90 degrees. Accordingly, it is possible to regulate the liquid crystal display unit (not shown) mounted on the first bracket (the movable bracket) 11 against the apparatus main body (not shown) mounted on the second bracket (the fixed bracket) 17 (see FIG. 2) at the arbitrary angular position within the first movable range (between 0 degree and 90 degrees).

Referring now FIGS. 13 through 15, the description will be made as regards operation of the movable range switching tilt hinge 20 at the state where the movable metal sheet 24 moves rightwards (nearer to the movable plate 111). FIG. 13 is a plan view of the movable range switching tilt hinge 20 that is similar to FIG. 6. FIG. 14 is a left-hand side view of the movable range switching tilt hinge 20 illustrated in FIG. 13. FIG. 15 is a left-hand side view showing a state where the first bracket 11 of the movable range switching tilt hinge 20 rotates around the axis O of rotation to move it.

In an initial state, the projecting piece 113 of the first bracket (the movable bracket) 11 is engaged with (comes in contact with) the first cam portion 151 of the stopper 15. That is, an angle of the first bracket (the movable bracket) 11 is equal to 0 degree. In this state, it will be assumed that the first bracket (the movable bracket) 11 is rotated around the spindle 12 (the axis O of rotation) in a clockwise direction. In this event, the first bracket (the movable bracket) 11 rotates around the spindle 12 (the axis O of rotation) with the projecting piece 113 of the first bracket (the movable bracket) 11 guided on the guide notch 15a. In the manner which is described above, inasmuch as the protrusion piece 245 of the movable metal sheet 24 is put into the first position at which it can be engaged with the first cam portion 151 of the stopper 15, the first bracket (the movable bracket) 11 rotates around the spindle 12 (the axis O of rotation) until a position at which the first cam portion 151 of the stopper 15 is engaged with (comes in contact with) the protrusion piece 245 of the movable metal sheet 24 (i.e. a position where the first bracket (the movable bracket) 11 rotates around in the clockwise direction at 40 degrees). Accordingly, at this position in question, rotation of the first bracket (the movable bracket) 11 is restrained.

It is therefore possible to stop and keep the first bracket (the movable bracket) 11 at an arbitrary angular position within the second movable range between 0 degree and 40 degrees. Accordingly, it is possible to regulate the liquid crystal display unit (not shown) mounted on the first bracket (the movable bracket) 11 against the apparatus main body (not shown) mounted on the second bracket (the fixed bracket) 17 (see FIG. 2) at the arbitrary angular position within the second movable range (between 0 degree and 40 degrees).

In addition, it is possible to change the second movable range by changing a mounting position of the protrusion piece 245 in the movable metal sheet 24, a disposed position of the first cam portion 151 of the stopper 15, or the like. In other words, the second movable range is not limited to the range between 0 degree and 40 degrees.

In the manner which is described above, the movable range switching tilt hinge 20 according to the exemplary embodiments of the present invention has two kinds of movable range (i.e. the first movable range and the second movable range) in one tilt hinge 20, it is therefore possible to easily switch the movable ranges by simple pushing operation.

In the exemplary aspect of this invention, the movable bracket may comprise a movable plate extending in a direction orthogonal to the axial direction of the spindle. In this event, the movable range switching member may comprise a shaft extending in parallel with the axial direction of the spindle, the shaft being movably mounted in the axial direction against the movable plate, and a movable metal sheet mounted to the shaft and having a protrusion piece, the movable metal sheet moving the protrusion piece between a first position at which the protrusion piece is enable to be engaged with the first cam portion and a second position at which the protrusion piece is disable to be engaged with the first corn portion. Whereby, the movable range switching tilt hinge switches the moving range of the movable bracket to the second movable range when the protrusion piece is moved to the first position.

The movable range switching member preferably may further comprise an urging arrangement urging the movable metal sheet away from the movable plate to move the protrusion piece toward the second position, and an engaging member mounted on the movable plate. The engaging member is engaged with the movable metal sheet to keep the protrusion piece to the first position when the movable metal sheet is moved nearer to the movable plate against an urging force of the urging arrangement. The movable metal sheet may comprise a metal sheet body mounted on the shaft and having a through hole through which the shaft passes, the metal sheet body extending in parallel with the movable plate, and first and second end plates being bent at both ends of the metal sheet body in a direction perpendicular thereto so as to sandwich the movable plate therebetween. In this event, the urging arrangement may comprise a spring disposed between the metal sheet body and the movable plate. The spring may comprise, for example, a taper coil spring.

The movable metal sheet further may comprise an engaging piece bent at a tip of the second end plate nearer to the first end plate. In this event, the engaging member may be made of a material of a plate spring and may an engaging protrusion which is engaged with a tip of the engaging piece when the projecting piece is kept to the first position. The engaging member preferably further may comprise a pushing portion that disengages engagement between the tip of the engaging piece and the engaging protrusion. When engagement between the tip of the engaging piece and the engaging protrusion is disengaged, the engaging piece may be engaged with the movable plate to keep the projecting piece at the second position. The first movable range may be, for example, a range between 0 degree and 90 degrees and the second movable range may be, for example, a range between 0 degree and 40 degrees.

While the invention has been particularly shown and described with reference to an exemplary embodiment thereof, the invention is not limited to this embodiment. It will be understood by those of ordinary skill in the art that various changes in form and details may be made therein without departing from the spirit an scope of the present invention as defined by the claims.

What is claimed is:

1. A movable range switching tilt hinge comprising:
   a movable range fixed tilt hinge comprising a spindle extending in an axial direction, a movable bracket rotatably arranged around said spindle and having a projecting piece, a fixed bracket fixed to said spindle, a stopper fixed to said spindle and having first and second cam portions, said stopper restricting a moving range of said movable bracket within a first movable range by engaging the projecting piece with the first and the second cam portions, and a friction imparting arrangement having a friction built between said movable bracket and said fixed bracket; and
   a movable range switching member mounted on said movable bracket, said movable range switching member being able to switch the moving range of said movable bracket between the first movable range and a second movable range smaller than the first movable range,
   wherein said movable bracket comprises a movable plate extending in a direction orthogonal to the axial direction of said spindle,
   wherein said movable range switching member comprises:
   a shaft extending in parallel with the axial direction of said spindle, said shaft being movably mounted in the axial direction against said movable plate; and
   a movable metal sheet mounted to said shaft and having a protrusion piece, said movable metal sheet moving the protrusion piece, by moving in the axial direction, between a first position at which the protrusion piece is able to be engaged with said first cam portion and a second position at which the protrusion piece is unable to be engaged with said first cam portion,
   whereby said movable range switching tilt hinge switches the moving range of said movable bracket to the second movable range when the protrusion piece is moved to the first position.

2. The movable range switching tilt hinge as claimed in claim 1, wherein said movable range switching member further comprises:
   an urging arrangement urging said movable metal sheet away from said movable plate to move said protrusion piece along the axial direction toward the second position; and
   an engaging member mounted on the movable plate, said engaging member being engaged with said movable metal sheet to keep said protrusion piece to the first position when said movable metal sheet is moved nearer to said movable plate along the axial direction against an urging force of said urging arrangement,
   whereby the moving range of said movable bracket is able to switch between the first movable range and the second movable range by a pushing operation.

3. The movable range switching tilt hinge as claimed in claim 2, wherein said movable metal sheet comprises a metal sheet body mounted on said shaft and having a through hole through which said shaft passes, said metal sheet body extending in parallel with said movable plate, and first and second end plates being bent at both ends of said metal sheet body in a direction perpendicular thereto so as to sandwich said movable plate therebetween,
   wherein said urging arrangement comprises a spring disposed between said metal sheet body and said movable plate.

4. The movable range switching tilt hinge as claimed in claim 3, wherein said spring comprises a taper coil spring.

5. The movable range switching tilt hinge as claimed in claim 3, wherein said movable metal sheet further comprises an engaging piece bent at a tip of said second end plate nearer to said first end plate,
    wherein said engaging member is made of a material of a plate spring, said engaging member having an engaging protrusion which is engaged with a tip of said engaging piece when said projecting piece is kept to the first position.

6. The movable range switching tilt hinge as claimed in claim 5, wherein said engaging member further comprises a pushing portion that disengages engagement between the tip of said engaging piece and said engaging protrusion.

7. The movable range switching tilt hinge as claimed in claim 5, wherein said engaging piece is engaged with said movable plate to keep said projecting piece at the second position when engagement between the tip of said engaging piece and said engaging protrusion is disengaged.

8. The movable range switching tilt hinge as claimed in claim 1, wherein said first movable range is a range between 0 degree and 90 degrees and said second movable range is a range between 0 degree and 40 degrees.

\* \* \* \* \*